United States Patent
Wang

(10) Patent No.: US 6,721,708 B1
(45) Date of Patent: Apr. 13, 2004

(54) POWER SAVING APPARATUS AND METHOD FOR AC-3 CODEC BY REDUCING OPERATIONS

(75) Inventor: Yunbiao Wang, Fremont, CA (US)

(73) Assignee: Hitachi America, Ltd., Tarrytown, NY (US)

(*) Notice: Subject to any disclaimer, the term of this patent is extended or adjusted under 35 U.S.C. 154(b) by 0 days.

(21) Appl. No.: 09/470,445

(22) Filed: Dec. 22, 1999

(51) Int. Cl.[7] .............................................. G06F 17/14
(52) U.S. Cl. ........................ 704/500; 708/405; 708/409
(58) Field of Search ................................. 704/200, 201, 704/203, 204, 500, 501, 503; 708/402, 404, 405, 409, 406

(56) References Cited

U.S. PATENT DOCUMENTS

| | | | | |
|---|---|---|---|---|
| 3,881,100 A | * | 4/1975 | Works et al. ............... | 708/404 |
| 4,601,006 A | | 7/1986 | Liu | |
| 5,163,017 A | * | 11/1992 | Wong et al. ............... | 708/406 |
| 5,349,549 A | * | 9/1994 | Tsutsui ...................... | 708/402 |
| 5,768,167 A | | 6/1998 | Kuroda | |
| 5,991,787 A | * | 11/1999 | Abel et al. .................. | 708/400 |
| 6,006,245 A | * | 12/1999 | Thayer ....................... | 708/404 |
| 6,098,088 A | * | 8/2000 | He et al. .................... | 708/406 |
| 6,199,039 B1 | * | 3/2001 | Chen et al. ................. | 704/201 |
| 6,304,847 B1 | * | 10/2001 | Jhung ......................... | 704/204 |
| 6,430,533 B1 | * | 8/2002 | Kolluru et al. ............. | 704/500 |
| 6,493,674 B1 | * | 12/2002 | Takamizawa ............... | 704/501 |
| 6,601,206 B1 | * | 7/2003 | Marvasti ..................... | 714/746 |
| 6,629,117 B2 | * | 9/2003 | Aizenberg et al. .......... | 708/404 |

FOREIGN PATENT DOCUMENTS

JP 2001-184338 * 7/2001

OTHER PUBLICATIONS

Sakamoto et al, "A Fast MPEG–Audio Layer III Algorithm for a 32–bit MCU," IEEE Transactions on Consumer Electronics, Aug. 19999, vol. 45, Issue 3, pp. 986 to 993.*

Fan et al., "On Fast Algorithms for Computing the Inverse Modified Discrete Cosine Transform," IEEE Signal Processing Letters, Mar. 1999, vol. 6, Issue 3, pp. 61 to 64.*

Digital Audio Compression Standard (AC–3), Advanced Television Systems Committee, Document A/52, Dec. 20, 1995, pp. 87 to 91.*

* cited by examiner

*Primary Examiner*—Richemond Dorvil
*Assistant Examiner*—Martin Lerner
(74) *Attorney, Agent, or Firm*—Dorsey & Whitney LLP; R. Michael Ananian

(57) ABSTRACT

The present invention provides a method and apparatus for performing an inverse modified discrete cosine transform (IMDCT) on at least one block of spectral coefficients representing an information signal in the frequency domain. The IMDCT provides an IMDCT output including at least one block of processed samples in the time domain. The new and novel method of the present invention includes converting spectral coefficients in the block of spectral coefficients to provide a block of frequency domain processed complex samples and processing the block of frequency domain processed complex samples into the block of processed samples in the time domain. Further, the converting spectral coefficients into the frequency domain processed complex samples includes regrouping the spectral coefficients into an even data sequence and an odd data sequence of spectral coefficients, and continuing to regroup the even data sequence and odd data sequence of spectral coefficients until each data sequence includes only two spectral coefficients. Butterfly computations are also performed. The performing of the butterfly computations includes performing at least one complex multiplication and at least one complex addition, and limiting the number of complex multiplications of the butterfly computations by a factor of two by calculating a first set of exponential components, $\beta_{N/2,n,1}$, for $n=0, 1, \ldots, N/8$, and setting a second set of exponential components, $\beta_{N/2,n+N/8,1}$, equal to $\beta_{N/2,n,1}$, for $n=0, 1, \ldots, N/8$.

11 Claims, 4 Drawing Sheets

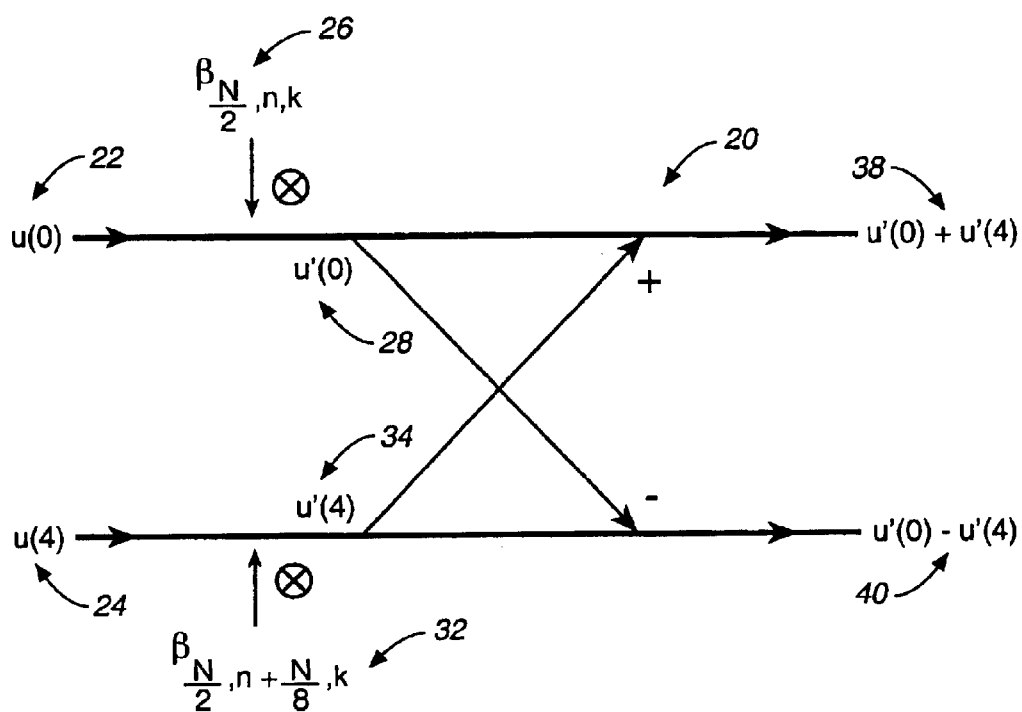
FIG._1

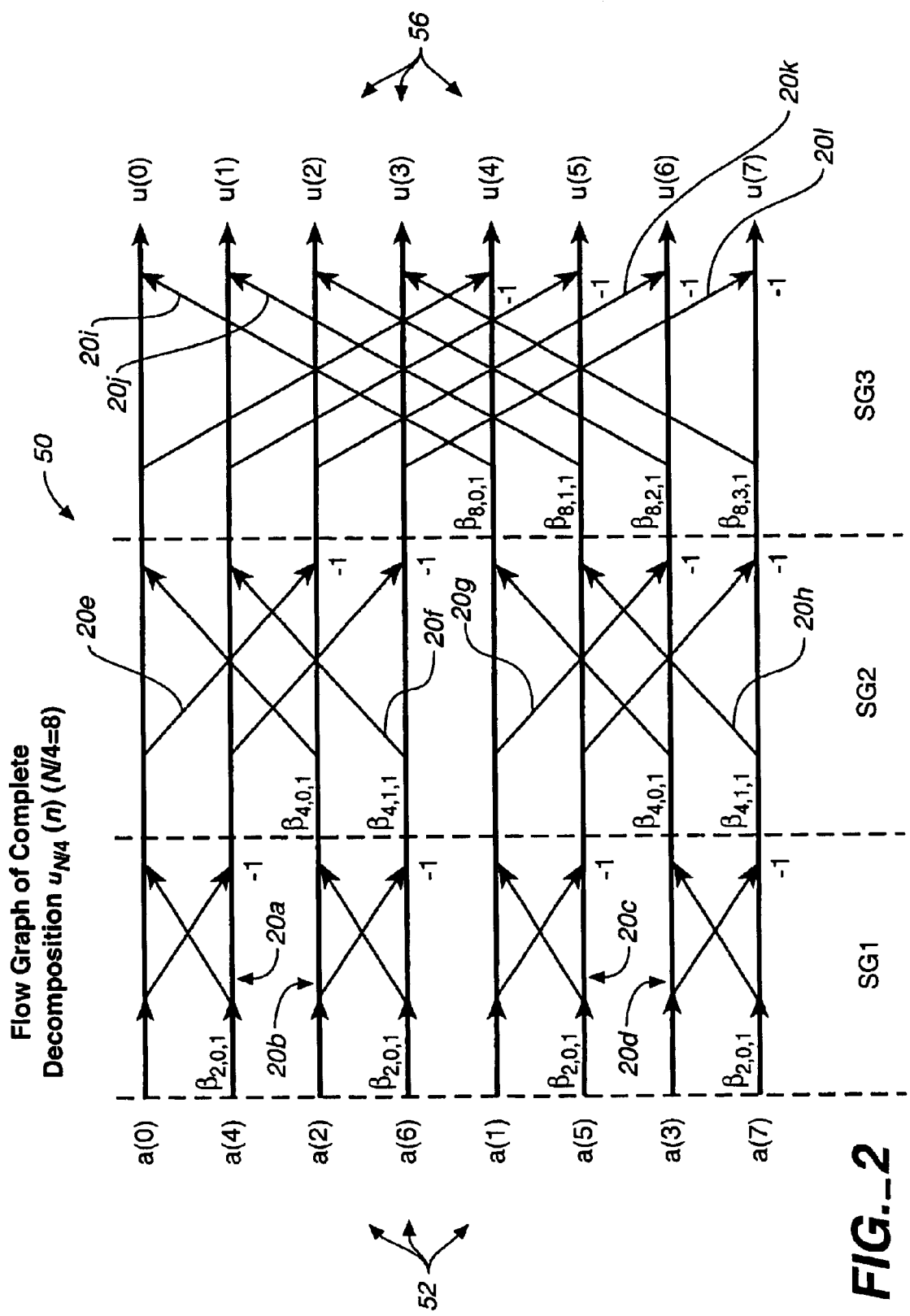

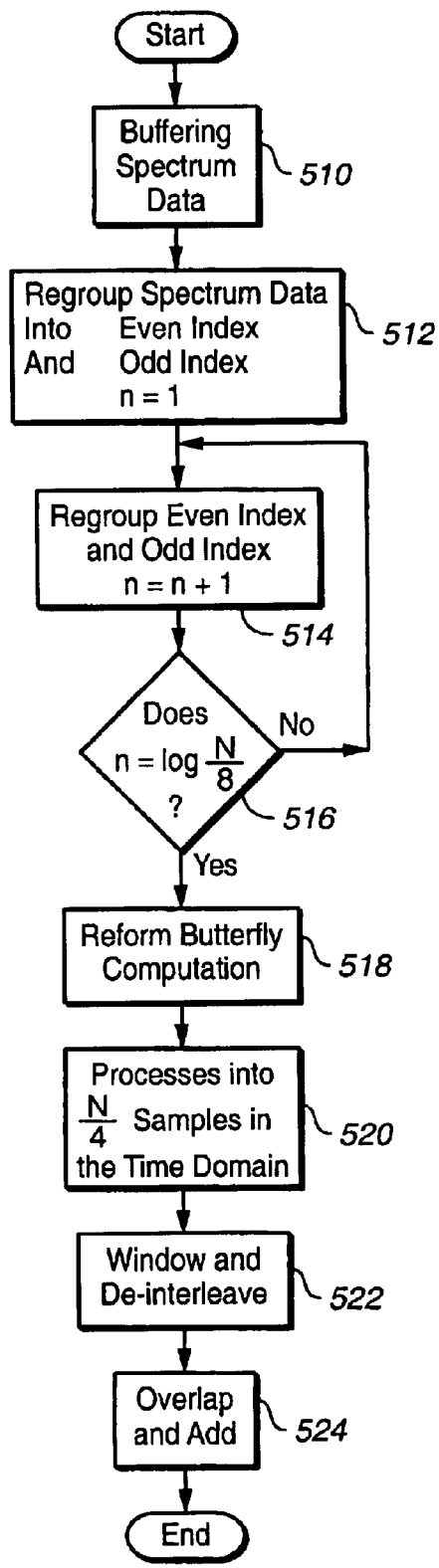
FIG._3

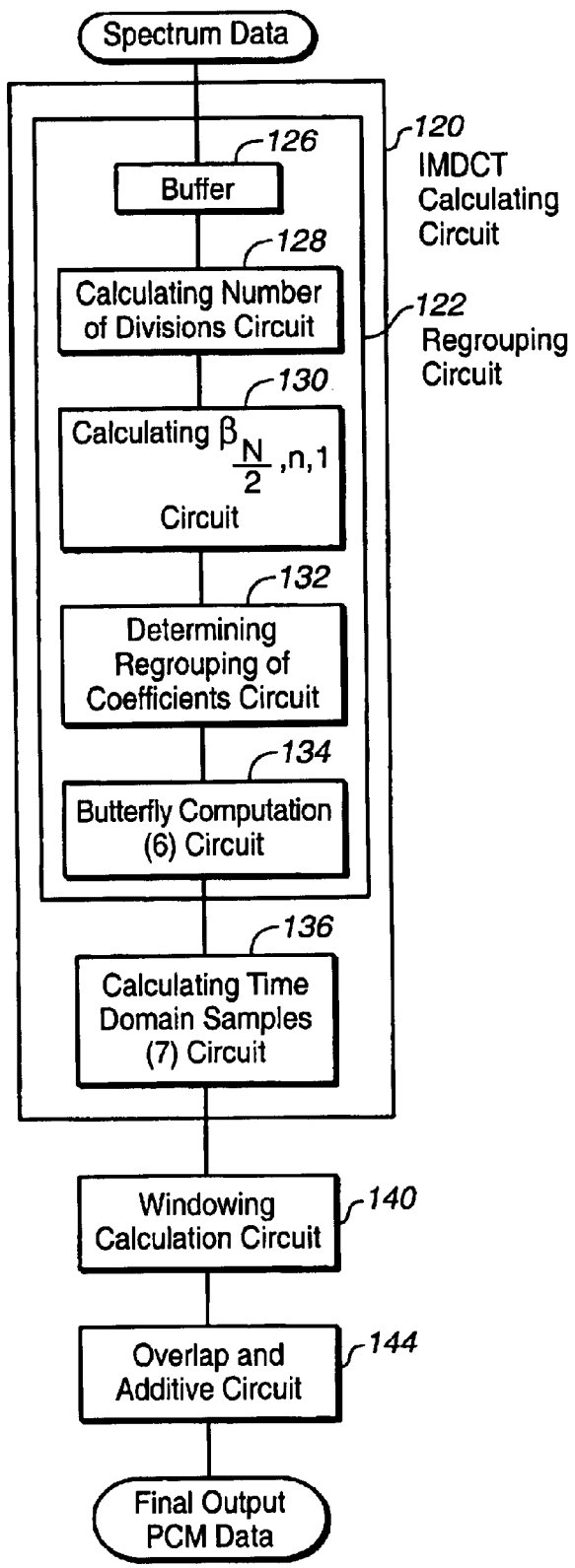
FIG._4

POWER SAVING APPARATUS AND METHOD FOR AC-3 CODEC BY REDUCING OPERATIONS

FIELD OF THE INVENTION

This invention pertains generally to AC-3 audio decompression, and more particularly to reducing operations and power saving for DSP processors.

BACKGROUND

Digital Audio Compression Standard (AC-3) is an audio standard adopted by the United States Advanced Television Systems Committee (ATSC) for High Density Television (HDTV) and Digital Video Data (DVD). By using AC-3 algorithms to compress a digital audio signal, the bandwidth requirement to transmit the audio signal will be greatly reduced. Both HDTV and DVD are for the consumer market.

The core method in audio decompression utilizing the AC-3 standard is a modified inverse discrete cosine transform (IMDCT) routine which requires most if not all of the computational power of a digital signal processor (DSP) or microprocessor. Because of the large numbers of computations, an IMDCT routine is also very time consuming.

When compressing audio signals utilizing the AC-3 format, the signals are defined in data blocks prior to compression. Data blocks in the AC-3 standard are defined as having one of two different lengths, one is 512 and another is 256. The encoder of the audio compression system determines the length to use and transmits this information to the decoder. The procedure for the IMDCT is the same for both lengths.

The AC-3 standard orthogonal method for decompressing an N block length compressed digital audio signal consisting of N/2 spectral coefficients has three steps:
Step 1: Converting the N/2 spectral coefficients into a block of N/4 frequency domain complex numbers in accordance with the following equation:

$$Z(k) = -(X(N/2-2k-1) + jX(2k))e^{j2\pi(8k+1)/(8N)} \quad (1)$$

for $k=0,1,\ldots,N/4-1$, where:
X: IMDCT frequency domain input signal;
N: block length;
Z(k): frequency domain complex numbers.
Step 2: Computing an N/4 Inverse Fast Fourier Transform (IFFT) on the frequency domain complex numbers to produce a block of N/4 time domain complex numbers:

$$z(n) = \sum_{k=0}^{N/4-1} Z(k)e^{j2\pi kn/(N/4)} \quad (2)$$

for $n=0,1,\ldots,N/4-1$, where:
z(n): processed-samples in the time domain.
Step 3: Performing the complex multiplication to compute the block of N/4 processed samples in the time domain from the N/4 time domain complex numbers:

$$y(n) = z(n)e^{j2\pi(8n+1)/(8N)} \quad (3)$$

for $n=0,1,\ldots,N/4-1$, where:
y(n): IMDCT output signal of processed samples in the time domain.

Two further steps are performed to obtain the final output Pulse Code Modulation (PCM) data. The first is windowing and de-interleaving and the second is overlap and adding.

Referring to Table 1, the original computational theory to compute the y(n) IMDCT output or processed samples in the time domain, prior to the implementation of the IFFT, required a large number of computations. The number of operations are too high to be implemented on a real time digital signal processor (DSP) chip. The most obvious and easy way to reduce the computation was to utilize IFFT in step 2. This significantly reduced the number of operations to obtain the processed samples in the time domain, see Table 1.

In order to support the dynamic range of audio signals according to the AC-3 standard, the IMDCT operation requires at least 24 bit operations. Since most DSP chips are 16 bits fixed point, a double precision operation is needed to complete the 24 bit IMDCT computation. However, the double-precision addition and multiplication requires an increase in the number of computational instructions. For example, an IMDCT will require 12 instructions to perform one double precision multiplication on Analog Device AD2100 DSP chip while a single precision multiplication requires a single instruction. A double precision IMDCT computation will require in excess of 12 instructions on the Hitachi SH DSP RISC controller plus DSP engine, while single precision will require a single instruction.

SUMMARY

There is a need to provide an apparatus and method for performing an IMDCT which utilizes less computational power. There is also a need for an apparatus and method which can reduce the computational time needed to perform an IMDCT. A more computationally and time efficient apparatus and method is needed to improve the effectiveness and implementation of decompressing digital audio signals. Further, a more efficient apparatus and method is needed to improve the effectiveness of decompressing digital audio signals compressed following the AC-3 standard.

The present invention provides a novel method and apparatus for performing an inverse modified discrete cosine transform (IMDCT) on at least one block of spectral coefficients representing an information signal in the frequency domain. The IMDCT provides an IMDCT output including at least one block of processed sampled in the time domain. The new and novel method of the present invention includes converting spectral coefficients in the block of spectral coefficients to provide a block of frequency domain processed complex samples and processing the block of frequency domain processed complex samples into the block of processed samples in the time domain. The converting spectral coefficients into the frequency domain processed complex samples includes regrouping the spectral coefficients in the block of spectral coefficients into an even data sequence and an odd data sequence of spectral coefficients, and continuing to regroup the even data sequence and odd data sequence of spectral coefficients until each data sequence includes only two spectral coefficients. The method and apparatus of the present invention also includes performing butterfly computations. The performing of the butterfly computations includes performing at least one complex multiplication and at least one complex addition, and limiting the number of complex multiplications of the butterfly computations by a factor of two by calculating a first set of exponential components, $\beta_{N/2,n,1}$, for n=0, 1, ..., N/8, and setting a second set of exponential components, $\beta_{N/2,n+N/8,1}$, equal to $\beta_{N/2,n,1}$, for n=0, 1, ..., N/8.

The new method and apparatus reduce the number of operations needed for the inverse modified discrete cosine transform (IMDCT). This reduction directly reduces power consumption of hardware. The main contribution combines all the stages in IMDCT and reformulates it into a new efficient method.

BRIEF DESCRIPTION OF THE DRAWINGS

FIG. 1 is schematic drawing of a representation of a single butterfly computational structure of performing two complex multiplications and two complex additions.

FIG. 2 depicts a complete butterfly computational structure for N/4=8, including three stages and N/8 butterfly computational structures within each stage.

FIG. 3 shows a flow chart of one embodiment of the method of performing an IMDCT transform.

FIG. 4 depicts one embodiment of the hardware implementation of the present apparatus for performing and IMDCT transform.

DETAILED DESCRIPTION

The present invention provides an apparatus and method for decompressing a compressed digital audio signal. The apparatus and method of the present invention incorporate a new and novel inverse modified discrete cosine transform (IMDCT) with significantly reduced computational overhead along with a significant reduction in processing time. The present invention is designed to be implemented in an AC-3 standard operating system, but can be implemented in any system which utilizes an IMDCT to transform data, for example MPEG. The present apparatus and method can reduce the computational overhead by 18% to 20% compared to the method suggested by the AC-3 standard.

Referring back to equations 1–3, the present invention combines these equations to form a intermediate equation 4 to provide a block of N/4 frequency domain processed complex samples:

$$y(n) = \sum_{k=0}^{N/4-1} -(X(N/2-2k-1)+jX(2k))e^{j2\pi(k+1/4)(n+1/4)/(N/4)} \quad (4)$$

k=0,1,...,N/4−1;

n=0,1,...,N/4−1;

where:

y(n): N/4 processed samples in the time domain;

X: IMDCT frequency domain input signal;

N: block length.

Defining the complex number component of equation 4 to be a(k)=−(X(N/2−2k−1)+jX(2k)), and the frequency domain exponential component, to be $\beta_{N,n,k}=e^{j2k\pi(n+1/4)/(N/4)}$, we can rewrite equation 4 as equation 5:

$$y(n) = e^{j2\pi(n+1/4)/N} \sum_{k=0}^{N/4-1} a(k)\beta_{N,n,k} \quad (5)$$

k=0,1,...,N/4−1;

n=0,1,...,N/4−1.

By further defining the summation of the products of complex number components and frequency domain exponential components, or intermediate complex components $(a(k)\beta_{N,n,k})$, to be defined as $$u(n) = \sum_{k=0}^{N/4-1} a(k)\beta_{N,n,k},$$

and regrouping the intermediate complex coefficients of u(n), into even and odd indices or data sequences, thus u(n) becomes:

$$u(n) = \sum_{k=0}^{N/8-1} a(2k)\beta_{N/2,n,k} + \beta_{N,n,1} \sum_{k=0}^{N/8-1} a(2k+1)\beta_{N/2,n,k} \quad (6)$$

for n=0,1,...,N/4−1.

Noting that the exponential component $\beta_{N/2,n+N/8,k} = \beta_{N/2,n,k}$ for n=0, 1, ..., N/8−1, the data sequence u(n) containing N/4 intermediate complex components can be divided into two data sequences each containing N/8 intermediate complex components. Decomposing or dividing the two N/8 data sequences by using the same method again and continuing the divisional process until each data sequence contains only two intermediate complex components, we divide the N/4 data sequence u(n) into $\log_2(N/4)$ butterfly stages. The total number of divisions of the data sequence u(n) equals $\log_2(N/8)$. Each butterfly stage then consists of N/8 butterfly computational structures as depicted in FIG. 1 and described more fully below. Further, each butterfly computational structure includes two complex multiplications and two complex additions, thus the total number of multiplications and additions needed to compute the block of N/4 frequency domain complex numbers is 2*N/8 $\log_2$(N/4).

FIG. 1 shows a single butterfly computational structure or stage 20, which includes a first input 22 including a complex spectral coefficient, for example a(0), and a second input 24, for example a(4) when N/4=8. First input 22, a(0), is multiplied by a first exponential component 26, for example $\beta_{N/2,n,k}$, resulting in a first product 28. Second input 24 is multiplied by a second exponential component 32, for example $\beta_{N/2,n+N/8,k}$, resulting in a second product 34. Second product 34 is then added to first product 28 to provide a first intermediate complex coefficient 38 for butterfly stage 20. Finally, second product 34 is subtracted from first product 28 to provide a second intermediate complex coefficient 40 for butterfly stage 20.

Noting again, from equation 6, that the exponential component $\beta_{N/2,n+N/8,1}$ is equal to $\beta_{N/2,n,1}$ for n=0, 1, ..., N/8−1, it can be seen that the number of complex multiplications can be reduced by a factor of two and thus the number of multiplications equals N/8 $\log_2$(N/4).

FIG. 2 shows a complete butterfly structure 50 and how to decompose butterfly computations of N/4=8 into three stages SG1–SG3 (log$_2$(N/8)=number of stages). Inputs 52 are supplied to first stage SG1 of butterfly structure 50 where N/8 butterfly computations 20a–d are performed, as depicted and described in relation to FIG. 1. Outputs of butterfly structures 20a–d are supplied to second stage SG2 of butterfly structure 50. N/8 butterfly computations 20e–h are performed in second stage SG2. The outputs of second stage SG2 are supplied to third stage SG3 where N/8 butterfly computations 20i–l are performed, thus outputting a block of N/4 frequency domain processed complex samples 56.

Having noted the computational similarities within the summation of equation 5, a new and novel method of computing an IMDCT is shown below. This new and novel method requires only two steps to compute the IMDCT output of N/4 processed samples in the time domain, y(n), as follows:

Step 1: Compute the summation of data sequences containing N/4 complex components to provide a block of N/4 frequency domain processed complex samples, u(n), by:

$$u(n) = \sum_{k=0}^{N/4-1} -(X(N/2 - 2k - 1) + jX(2k))e^{j2\pi k(n+1/4)/(N/4)}$$

for $n=0,1,\ldots,N/4-1$.

Step 2: Compute the IMDCT output, y(n), of N/4 processed samples in the time domain, by:

$$y(n) = e^{j2\pi(n+1/4)/N}u(n) \tag{8}$$

for $n=0,1,\ldots,N/4-1$.

Note step 1 is calculated through the regrouping of the components and utilizing the butterfly computations as described above and depicted in FIG. 2. If calculated directly, the IMDCT requires O(N$^2$) operations.

In one embodiment, to ease the regrouping of the complex spectral coefficients of the input signal, the coefficients are stored in memory, such as a buffer memory, RAM, or ROM memory, and addressed in bit-reversed order. For example, if N/4=8 and the address of a(1) in binary is 001, the bit-reversed address will be (100)$_2$=4, index 2 defining binary. The bit-reversed address of a(4) will be (001)$_2$=1. Thus the stored order for the coefficients provides that the coefficients to be added in the butterfly computations were sequentially ordered. For example, for N/4=8, the order of addressing would be a(0), a(4), a(2), a(6), a(1), a(5), a(3), a(7). Thus the even coefficients are grouped and the odd coefficients are grouped. The bit-reverse ordering simplifies the regrouping prior to performing the butterfly computations and provides further assurance of the sequence order of the IMDCT output.

FIG. 3 depicts a flow chart showing the sequence of signal processing for performing an IMDCT according to one embodiment of the present invention. Step S10 includes storing the coefficients in a buffer such that the coefficients are addressed in reverse bit order for ease of regrouping prior to performing the butterfly computations. Step S12 includes the regrouping of N/4 complex spectral coefficients of the input signal into even and odd indices or data sequences. Step S14 consists of the regrouping of both the even and odd data sequences into two separate N/16 data sequences. Condition S16 determines if the number of complex coefficients within a data sequence is equivalent to two, or in the alternative, that the complex spectral coefficients have been divided log$_2$(N/8) times. If no, step S14 is repeated to further divide the data sequences. If yes, the butterfly computations of equation 7 are performed providing a block of N/4 frequency domain processed complex samples in step S18. Step S20 includes the processing of the block of N/4 frequency domain processed complex samples according to the product of equation 8 to produce N/4 processed samples in the time domain or the IMDCT output. In the next step S22, the IMDCT output is windowed and de-interleaved. Step S24 provides overlap and addition to complete the decompression and produce the final output PCM data.

FIG. 4 shows one embodiment of a hardware implementation of the decompression circuit for carrying out the digital audio signal IMDCT decompression method of the present invention. The circuit depicted in FIG. 4 shows an IMDCT circuit 120, coupled to a windowing calculation circuit 140 which is further coupled to an overlap and addition circuit 144 for producing the IMDCT output. IMDCT circuit includes a regrouping circuit 122 coupled to a calculating time domain circuit 136.

Regrouping circuit 122 includes buffer 126 for storing the complex spectral coefficients in reverse bit order for ease in regrouping. Buffer 126 couples to calculating the number of butterfly divisions circuit 128. Calculating the number of divisions circuit 128 is coupled to calculating β circuit 130 which calculates $\beta_{N/2,n,1}$ for n=0, 1, ..., N/8−1 such that $\beta_{N/2,n+N/8,1}$ is equal to $\beta_{N/2,n,1}$ for n=0, 1, ..., N/8−1 Calculating β circuit 130 couples to determining regrouping of coefficients circuit 132 which regroups the spectral coefficients for the butterfly computations. Determining regrouping of coefficients circuit 132 couples to the butterfly computation circuit 134 which performs the complex multiplications and summations of equation 7 to produce the block of N/4 frequency domain processed complex samples.

The frequency domain processed complex samples outputted from regrouping circuit 122 are inputted into calculating time domain samples circuit 136 which performs the complex multiplication of equation 8 and the resulting product is the IMDCT output including blocks of N/4 processed samples in the time domain. The IMDCT output is the input to windowing calculation circuit 140.

The circuit depicted in FIG. 4 is preferably implemented through a DSP circuit or chip and memory. However, the decompression circuit can also be implemented utilizing a plurality of multiprocessors or alternatively through discrete circuitry.

Table 1 summarizes the total number of processing operations needed for performing an IMDCT to decompress a digital audio signal according to an AC-3 standard through: (i) the original prior art computational method; (ii) a prior art method implementing a IFFT; and (iii) the novel process of the present invention.

TABLE 1

Number of operation for different method

| Step | operation | i) direct | ii) IFFT | iii) new |
| --- | --- | --- | --- | --- |
| 1 | multiply | 512 | 512 | 0 |
|   | addition | 256 | 256 | 0 |
| 2 | multiply | 6556 | 1792 | 1792 |
|   | addition | 32768 | 1792 | 1792 |
| 3 | multiply | 512 | 512 | 512 |
|   | addition | 256 | 256 | 256 |
| Total | multiply | 66560 | 2816 | 2304 |
|   | addition | 33280 | 2304 | 2048 |

It can be seen from Table 1 that the present invention provides significant reductions in the total number of operations, i.e. 15% compared to the IFFT process. This equates to a significant reduction in time needed to perform the IMDCT and thus a reduction in the total processing power needed to complete the IMDCT. Due to the reduced number of computations, the reduced processing power needed to perform the IMDCT is approximately 18 to 20% compared to the IFFT process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A method of performing an inverse modified discrete cosine transform (IMDCT) on at least a block of N/4 spectral coefficients representing an information signal in the frequency domain, the IMDCT providing an IMDCT output including at least one block of processed samples in the time domain, the method comprising:

converting spectral coefficients in the block of spectral coefficients to provide a block of N/4 frequency domain processed complex samples, u(n), where the coefficients comprises N/4 spectral coefficients, are represented as X and:

$$u(n) = \sum_{k=0}^{N/4-1} -(X(N/2-2k-1) + jX(2k))e^{j2\pi k(n+1/4)/(N/4)};$$

where $n = 0, 1, \ldots N/4 - 1$;

and processing the block of N/4 frequency domain processed complex samples into the block of processed samples in the time domain by at least multiplying each sample by $e^{j2\Pi(n+\frac{1}{4})/N}$.

2. The method of performing the IMDCT as claimed in claim 1, wherein:

the converting spectral coefficients into the frequency domain processed complex samples including:
regrouping the spectral coefficients in the block of spectral coefficients into an even data sequence and an odd data sequence of spectral coefficients; and
continuing to regroup the even data sequence and odd data sequence of spectral coefficients until each data sequence includes only two spectral coefficients.

3. The method of performing the IMDCT as claimed in claim 2, wherein:

the converting spectral coefficients into frequency domain processed complex samples including performing butterfly computations.

4. The method of performing the IMDCT as claimed in claim 3, wherein:

the performing the butterfly computations including:
performing at least one complex multiplication and at least one complex addition; and
limiting the number of complex multiplications of the butterfly computations by a factor of two, including:

calculating a first set of exponential components, βN/2, n,1, for n=0, 1, ..., N/8; and
setting a second set of exponential components, βN/2, n+N/8,1, equal to βN/2,n,1, for n=0, 1, ..., N/8.

5. The method of performing the IMDCT as claimed in claim 1, wherein:

digitally converting spectral coefficients in the block of spectral coefficients to provide a block of frequency domain processed complex samples; and
digitally processing the block of frequency domain processed complex samples into the block of processed samples in the time domain.

6. A method of digitally decompressing a compressed signal including frequency domain data blocks of variable length having a variable number of spectral coefficients, the method of decompressing comprising:

regrouping the spectral coefficients of the data blocks into a plurality of data sequences such that the data sequences include two spectral coefficients;
performing a weighted sum using butterfly computations on the plurality of data sequences to provide N/4 frequency domain processed complex samples, u(n), where N/4 spectral coefficients, are represented as X and:

$$u(n) = \sum_{k=0}^{N/4-1} -(X(N/2-2k-1) + jX(2k))e^{j2\pi k(n+1/4)/(N/4)};$$

where $n = 0, 1, \ldots N/4 - 1$;

processing the N/4 frequency domain processed complex samples by multiplying each sample by $e^{j2\Pi(n+\frac{1}{4})/N}$ where n represents the number of processed sample, n=0,1, ..., N/4−1 to generate an IMDCT output;
windowing the IMDCT output to produce a windowed output; and
overlapping and adding the windowed output to produce a digital signal in the time domain.

7. The method as claimed in claim 6, further comprising performing the butterfly computations including:

calculating a first set of exponential components, βN/2, n,1, for n=0, 1, ..., N/8; and
setting a second set of exponential components, βN/2,n+N/8,1, equal to βN/2,n,1.

8. A method of performing an inverse modified discrete cosine transform (IMDCT) on at least one block of spectral coefficients representing an information signal in the frequency domain, the IMDCT providing an IMDCT output including at least one block of processed samples in the time domain, the method comprising:

converting spectral coefficients in the block of spectral coefficients wherein said block of spectral coefficients comprises N/4 spectral coefficients, and are represented as X;
providing a block of frequency domain processed complex samples, u(n), where:

$$u(n) = \sum_{k=0}^{N/4-1} -(X(N/2-2k-1) + jX(2k))e^{j2\pi k(n+1/4)/(N/4)};$$

where $n = 0, 1, \ldots N/4 - 1$ wherein said block of frequency domain processed complex samples comprises N/4 frequency domain processed complex samples; and processing the block of frequency domain processed complex samples into the block of processed samples in the time domain by multiplying each sample by $e^{j2\Pi(n+\frac{1}{4})N}$ where n represents the number of processed sample, n=0,1, ..., N/4−1.

9. A method of performing an inverse modified discrete cosine transform (IMDCT) output of N/4 processed samples in the time domain, y(n), the method comprising:

computing a summation of data sequences containing N/4 complex components to provide N/4 frequency domain processed complex samples, u(n), where u(n) is given by:

$$u(n) = \sum_{k=0}^{N/4-1} -(X(N/2-2k-1)+jX(2k))e^{j\pi k(n+1/4)/(N/4)}$$

where $n = 0, 1, ... N/4 - 1$; and computing the IMDCT output, y(n), where y(n) is given by:

$$y(n)=e^{j2\Pi(n+\frac{1}{4})N}u(n) \text{ for } n=0,1,...,N/4-1.$$

10. A method according to claim 9, wherein the act of computing the summation of data sequences comprises regrouping components and utilizing butterfly computations.

11. A method of performing an inverse modified discrete cosine transform (IMDCT) on at least one block of spectral coefficients, X, representing an information signal in the frequency domain, the IMDCT providing an IMDCT output including at least one block of processed samples in the time domain, the method consisting of:

providing a block of frequency domain processed complex samples ,u(n), where:

$$u(n) = \sum_{k=0}^{N/4-1} -(X(N/2-2k-1)+jX(2k))e^{j2\pi k(n+1/4)/(N/4)};$$

where $n = 0, 1, ... N/4 - 1$ wherein said block of frequency domain processed complex samples comprises N/4 frequency domain processed complex samples; and processing the block of frequency domain processed complex samples into the block of processed samples in the time domain by multiplying each sample by $e^{j2\Pi(n+\frac{1}{4})N}$ where n represents the number of processed sample, n=0,1, ..., N/4−1.

* * * * *